April 12, 1960     E. G. GRAVES, JR     2,932,112
FISH LURE
Filed May 16, 1957
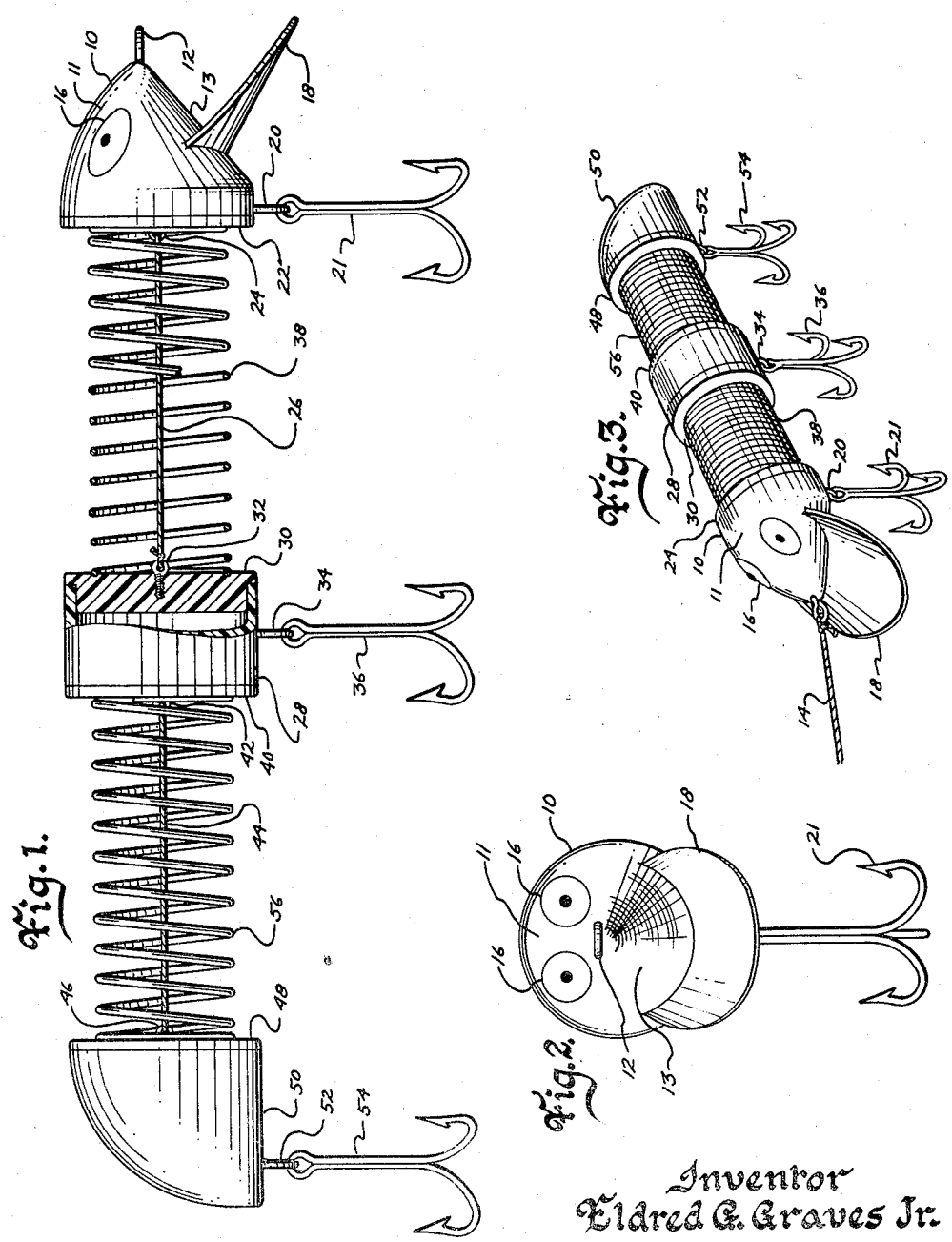
Inventor
Eldred G. Graves Jr.
by Talbert Dick and Zarley
Attorneys

United States Patent Office 2,932,112
Patented Apr. 12, 1960

2,932,112

FISH LURE

Eldred G. Graves, Jr., Bloomington, Ill.

Application May 16, 1957, Serial No. 659,541

5 Claims. (Cl. 43—42.02)

My invention relates to fish lures and more particularly to a fish lure that can create a very realistic lifelike appearance.

Much has been done in the fishing art to create lures that would effectively attract the fish. Most of the lures known to me have attempted to create a lifelike appearance by a plurality of fins or moving parts. The greatest objection to these lures is that they seem to be alive only when placed in a strong current of water or when they are pulled at a substantial rate of speed through the water. In short, they are quite insensitive to movement and are therefore not very lifelike. Furthermore, the fishing lures known to me do not completely simulate the live characteristics of an insect or minnow because their mechanical structure inhibits their complete freedom of movement.

Therefore, the principal object of my invention is to provide a fish lure which has a realistic lifelike appearance.

It is a further object of my invention to provide a fish lure that can display lifelike movements in comparatively still waters.

A still further object of my invention is to provide a fish lure that can display animate characteristics without being subjected to any substantial relative movement in the water.

A still further object of my invention is to provide a fish lure that is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a partial sectional view of my device with the spring elements in expanded position to more fully illustrate its construction, Fig. 2 is a front elevation of my device and Fig. 3 is a perspective view of my device with the spring elements in their normal retracted position.

I have used the numeral 10 to generally designate the hollow head portion of my lure. An eyelet screw 12 is located in the forward end thereof to receive a fishing line 14, as shown in Fig. 3. Head portion 10 is not symmetrical and can have a rounded upper portion 11 and a flatter angular lower portion 13. Eyes 16 may be painted or otherwise placed on the sides of the head portion 10. A spoon shaped fin 18 can be placed on the head portion 10 but its presence is not absolutely critical to the successful operation of my device. The fin 18 is of light metal or similar material so that it can be selectively bent to change its position with respect to the head portion. An eyelet 20 extends from the lower side of the head 10 and supports hook element 21. Plug 22, which is preferably made of rubber or plastic, frictionally seals the rear end of head 10 and eyelet 24 extends from the center thereof and receives the forward end of line member 26. The rear end of line member 26 is operatively connected to hollow float member 28, as shown in Fig. 1. Float 28 has its forward end frictionally sealed by plug 30 which is identical to the plug 22 in head portion 10. Eyelet 32 extends forwardly from the center of plug 30 to receive the rearward end of line 26. Eyelet 34 extends from the center bottom of float 28 and supports hook element 36. A highly sensitive lightweight spring 38 embraces line 26 and has its forward and rearward ends embedded in the plugs 22 and 30, respectively. Spring 38 is normally in its compressed position, as shown in Fig. 3. It should be noted that line 26 has a length greater than the compressed length of spring 38 and cannot become taut until spring 38 is expanded as shown in Fig. 1.

Plug 40, which is identical to plugs 22 and 30, frictionally seals the rear end of float 28. Eyelet 42 extends from the center of plug 40 and receives the forward end of line 44. The rearward end of line 44 is secured to eyelet 46 which projects from the center of plug 48. Plug 48 is identical to plugs 22, 30 and 40 and frictionally seals the hollow tail member 50. An eyelet 52 extends from the lower surface of hollow tail 50 and supports hook element 54. A spring member 56, which is similar to spring 38, embraces line 44 and has its forward and rearward ends embedded in the plugs 40 and 48, respectively. The length of line 44 is greater than the compressed length of spring 56. It is preferable that head 10, float 28, tail 50, lines 26 and 44, and springs 38 and 56 all have the same longitudinal axis.

The normal operation of my device is as follows: The fish line 14 is attached to eyelet 12 and the lure is deposited in the water in conventional fashion. Whenever there is relative movement between the water and lure unit, which can be brought about by trolling in still water or holding a steady line in a moving stream, the force of the water striking the outer surfaces of plugs 30 and 48 will tend to cause float 28 to move rearwardly from head 10 and tail 50 will withdraw from float 28 in the same manner. This phenomenon causes the expansion of springs 38 and 56 and this expansion is of course limited by lines 26 and 44. The expansion of these sensitive springs 38 and 56 creates a very lifelike appearance of the device and this animate appearance is magnified by several other factors which simultaneously take place. First of all, it should be noted that the springs 38 and 56 will expand and retract whenever the relative speed between the unit and the water is changed. The great sensitivity of these springs to the moving water brings about a pulsating effect of the springs on many occasions. This, of course, also enhances the lifelike appearance of my device. It should also be noted that spring 38 is more active than spring 56 because float 28 tends to "break-water" for the tail portion 50. Thus, the uneven activities of the two springs avoid the appearance of an inanimate mechanical movement.

It is apparent that the spring elements 38 and 56 will flex in any direction despite their degree of expansion or contraction. Thus, a wave or ripple striking my lure broadside could result in lateral disalignment of the parts and this characteristic also contributes to the live appearance of the unit. The non-symmetrical surfaces 11 and 13 of head 10 invite a bobbing effect of the lure as it moves through the water or as the stream moves past the lure. The fin 18 also contributes to this bobbing function and it can also be utilized in determining the depth to which the lure will travel while moving through the water. The fin can be bent at any desirable angle so that its effect on the unit can be selectively adjusted.

The above description of my invention makes it apparent that my device will present lifelike movements even while lying in substantially still water. This is true because the slightest ripple or breeze will cause some reaction of the sensitive spring elements 38 and 56. The hollow tail 50, float 28 and head 10 are obviously more buoyant than either of the springs 38 and 56. These light buoyant elements will immediately react to any disturbance and the displacement of the springs by these elements readily creates the desired lifelike appearance of the lure unit. The fin 18 can also assist in actuating the springs and its spoon-shaped structure permits it to react to ripples and the like approaching from different directions.

Since the plugs 48, 40, 30 and 22 are only frictionally secured to their respective hollow tail, float or head elements, my lure device can easily have any of its parts replaced without replacing the whole unit. Furthermore, if hook elements 36 or 54 ever become snagged, it is possible to apply great tension on line 14 and disengage the unsnagged portion from the entangled elements.

Thus, it will be seen that I have accomplished at least the stated objects of my invention.

Some changes may be made in the construction and arrangement of my fish lure without departing from the real spirit and purpose of my invention, and it is my intention to cover by my claims, any modified forms of structure or use of mechanical equivalents which may be reasonably included within their scope.

I claim:

1. In a fish lure, a plurality of buoyant members, said buoyant members secured together by elongated resilient coil springs, said springs being normally in a compressed position, a loosely flexible means connecting said buoyant members for limiting the expansion of said springs, at least one of said buoyant members adapted to be secured to a fish line, and a hook element on at least one of said buoyant members.

2. In a fish lure, a plurality of buoyant members, said buoyant members secured together by elongated resilient coil springs, a loosely flexible means connecting said buoyant members for limiting the expansion of said springs, at least one of said buoyant members adapted to be secured to a fish line, and a hook element on at least one of said buoyant members.

3. In a fish lure, a plurality of buoyant members, said buoyant members detachably secured together by elongated resilient coil springs, said springs being normally in a compressed position, a loosely flexible means connecting said buoyant members for limiting the expansion of said springs, at least one of said buoyant members adapted to be secured to a fish line, and a hook element on at least one of said buoyant members.

4. In a fish lure, a head member adapted to be operatively secured to a fish line, a first elongated resilient coil spring secured to said head member and extending therefrom, a buoyant member secured to the extended end of said first elongated resilient coil spring, a second elongated resilient coil spring secured to said buoyant member and extending therefrom, a tail member secured to the extended end of said second elongated resilient coil spring, an elongated loosely flexible means connecting said buoyant member with said head and tail members for limiting the expansion of said springs, and a hook element on at least one of said head, buoyant or tail members.

5. In a fish lure, a plurality of spaced apart buoyant members, elongated loosely flexible lines connecting said buoyant members, resilient coil springs extending between said buoyant members and embracing said flexible lines, a hook element on at least one of said buoyant members; and at least one of said buoyant members adapted to be operatively connected to a fish line.

References Cited in the file of this patent

UNITED STATES PATENTS

| 857,883 | Kreisser | June 25, 1907 |
| 1,109,439 | Maus | Sept. 1, 1914 |
| 1,359,618 | Oliver et al. | Nov. 23, 1920 |
| 1,516,174 | Cox et al. | Nov. 18, 1924 |
| 1,788,798 | Lesot | Jan. 13, 1931 |
| 2,098,095 | Hoefler | Nov. 2, 1937 |
| 2,606,390 | Farmer | Aug. 12, 1952 |

FOREIGN PATENTS

| 3,631 | Great Britain | 1905 |